US008949140B2

(12) United States Patent
Liu et al.

(10) Patent No.: US 8,949,140 B2
(45) Date of Patent: Feb. 3, 2015

(54) METHOD AND SYSTEM FOR DYNAMIC SOFTWARE RECONFIGURATION TRIGGERED BY COMPONENT- OR SYSTEM-INITIATED EVENTS

(75) Inventors: Zhen Liu, Tarrytown, NY (US); Anton V. Riabov, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 1363 days.

(21) Appl. No.: 12/106,757

(22) Filed: Apr. 21, 2008

(65) Prior Publication Data

US 2009/0265718 A1 Oct. 22, 2009

(51) Int. Cl.
G06F 9/44 (2006.01)
G06F 9/445 (2006.01)
G06Q 10/04 (2012.01)
G06Q 10/06 (2012.01)

(52) U.S. Cl.
CPC .. *G06F 8/60* (2013.01); *G06F 8/30* (2013.01); *G06Q 10/04* (2013.01); *G06Q 10/06* (2013.01)
USPC .......................... 705/7.27; 705/348; 717/168

(58) Field of Classification Search
CPC ................................................. G06Q 10/0633
USPC .............................................. 705/7.27, 348
See application file for complete search history.

(56) References Cited

U.S. PATENT DOCUMENTS

| | | |
|---|---|---|
| 4,571,678 A | 2/1986 | Chaitin |
| 5,159,685 A | 10/1992 | Kung |
| 5,187,788 A | 2/1993 | Marmelstein |
| 5,657,428 A | 8/1997 | Tsuruta et al. |
| 5,659,754 A | 8/1997 | Grove et al. |
| 5,675,757 A | 10/1997 | Davidson et al. |
| 5,675,805 A | 10/1997 | Boldo et al. |
| 5,696,693 A | 12/1997 | Aubel et al. |
| 5,937,195 A | 8/1999 | Ju et al. |
| 5,999,729 A | 12/1999 | Tabloski, Jr. et al. |
| 6,032,142 A | 2/2000 | Wavish |
| 6,053,951 A | 4/2000 | McDonald et al. |
| 6,339,783 B1 | 1/2002 | Horikiri |
| 6,347,320 B1 | 2/2002 | Christensen et al. |
| 6,430,698 B1 | 8/2002 | Khalil et al. |

(Continued)

OTHER PUBLICATIONS

Riabov, A.; Liu, Z., "Scalable Planning for Distributed Stream Processing Systems", Proceedings of the 2006 International Conference on Automated Planning & Scheduling (Jun. 6-10, 2006), pp. 31-40 [retrieved from https://www.aaai.org/Papers/ICAPS/2006/ICAPS06-004.pdf on Sep. 16, 2011].*

(Continued)

*Primary Examiner* — Brian W Wathen
(74) *Attorney, Agent, or Firm* — F. Chau & Associates, LLC (57) ABSTRACT

A method for handling events in compositional applications represented as processing graphs, including: receiving an event notification; modifying a planning domain according to the event notification; generating a new processing graph for a previously deployed processing graph by using the modified planning domain; determining if the new processing graph is different than the previously deployed processing graph; and if the processing graphs are different: reconfiguring the previously deployed processing graph to match the new processing graph; or deploying the new processing graph and replacing the previously deployed processing graph with the newly deployed processing graph.

15 Claims, 7 Drawing Sheets

(56) References Cited

U.S. PATENT DOCUMENTS

| | | |
|---|---|---|
| 6,601,112 B1 | 7/2003 | O'Rourke et al. |
| 6,665,863 B1 | 12/2003 | Lord et al. |
| 6,721,747 B2 | 4/2004 | Lipkin |
| 6,792,595 B1 | 9/2004 | Storistenau et al. |
| 6,799,184 B2 | 9/2004 | Bhatt et al. |
| 6,813,587 B2 | 11/2004 | McIntyre et al. |
| 6,891,471 B2 | 5/2005 | Yuen et al. |
| 6,983,446 B2 | 1/2006 | Charisius et al. |
| 7,000,022 B2 | 2/2006 | Lisitsa et al. |
| 7,062,762 B2 | 6/2006 | Krishnamurthy et al. |
| 7,103,873 B2 | 9/2006 | Tanner et al. |
| 7,164,422 B1 | 1/2007 | Wholey, III et al. |
| 7,174,536 B1 | 2/2007 | Kothari et al. |
| 7,222,182 B2 | 5/2007 | Lisitsa et al. |
| 7,231,632 B2 | 6/2007 | Harper |
| 7,263,694 B2 | 8/2007 | Clewis et al. |
| 7,290,244 B2 | 10/2007 | Peck et al. |
| 7,334,216 B2 | 2/2008 | Molina-Moreno et al. |
| 7,409,676 B2 | 8/2008 | Agarwal et al. |
| 7,426,721 B1 | 9/2008 | Saulpaugh et al. |
| 7,466,810 B1 | 12/2008 | Quon et al. |
| 7,472,379 B2 | 12/2008 | Chessell et al. |
| 7,499,906 B2 | 3/2009 | Kloppmann et al. |
| 7,536,676 B2 | 5/2009 | Baker et al. |
| 7,543,284 B2 | 6/2009 | Bolton et al. |
| 7,565,640 B2 | 7/2009 | Shukla et al. |
| 7,614,041 B2 | 11/2009 | Harper |
| 7,627,808 B2 | 12/2009 | Blank et al. |
| 7,657,436 B2 | 2/2010 | Elmore et al. |
| 7,681,177 B2 | 3/2010 | LeTourneau |
| 7,685,566 B2 | 3/2010 | Brown, Jr. et al. |
| 7,716,167 B2 | 5/2010 | Colossi et al. |
| 7,716,199 B2 | 5/2010 | Guha |
| 7,730,467 B1 | 6/2010 | Hejlsberg et al. |
| 7,756,855 B2 | 7/2010 | Ismalon |
| 7,769,747 B2 | 8/2010 | Berg et al. |
| 7,773,877 B2 | 8/2010 | Yang et al. |
| 7,792,836 B2 | 9/2010 | Taswell |
| 7,797,303 B2 | 9/2010 | Roulland et al. |
| 7,809,801 B1 | 10/2010 | Wang et al. |
| 7,810,085 B2 | 10/2010 | Shinnar et al. |
| 7,814,123 B2 | 10/2010 | Nguyen et al. |
| 7,827,210 B2 | 11/2010 | Meliksetian et al. |
| 7,860,863 B2 | 12/2010 | Bar-Or et al. |
| 7,861,151 B2 | 12/2010 | Milic-Frayling et al. |
| 7,877,387 B2 | 1/2011 | Hangartner |
| 7,882,485 B2 | 2/2011 | Feblowitz et al. |
| 7,886,269 B2 | 2/2011 | Williams et al. |
| 7,886,273 B2 | 2/2011 | Hinchey et al. |
| 7,900,201 B1 | 3/2011 | Qureshi et al. |
| 7,954,090 B1 | 5/2011 | Qureshi et al. |
| 7,958,148 B2 | 6/2011 | Barnes et al. |
| 7,984,417 B2 | 7/2011 | Ben-Zvi et al. |
| 7,984,423 B2 | 7/2011 | Kodosky et al. |
| 7,992,134 B2 | 8/2011 | Hinchey et al. |
| 8,001,527 B1 | 8/2011 | Qureshi et al. |
| 8,032,522 B2 | 10/2011 | Goldstein et al. |
| 8,037,036 B2 | 10/2011 | Blumenau et al. |
| 8,046,737 B2 | 10/2011 | Wittenberg et al. |
| 8,078,487 B2 | 12/2011 | Li et al. |
| 8,078,953 B2 | 12/2011 | Kunz et al. |
| 8,086,598 B1 | 12/2011 | Lamb et al. |
| 8,122,006 B2 | 2/2012 | de Castro Alves et al. |
| 2002/0109706 A1 | 8/2002 | Lincke et al. |
| 2004/0015783 A1 | 1/2004 | Lennon et al. |
| 2004/0249664 A1 | 12/2004 | Broverman et al. |
| 2005/0096960 A1* | 5/2005 | Plutowski et al. ............ 705/8 |
| 2005/0097224 A1 | 5/2005 | Chen et al. |
| 2005/0125738 A1* | 6/2005 | Srivastava et al. ........... 715/760 |
| 2005/0125739 A1 | 6/2005 | Thompson et al. |
| 2005/0159994 A1* | 7/2005 | Huddleston et al. ........... 705/10 |
| 2005/0172306 A1 | 8/2005 | Agarwal et al. |
| 2005/0177406 A1 | 8/2005 | Facciorusso et al. |
| 2005/0192870 A1 | 9/2005 | Geddes |
| 2006/0212836 A1 | 9/2006 | Khushraj et al. |
| 2007/0033590 A1 | 2/2007 | Masuouka et al. |
| 2007/0043607 A1* | 2/2007 | Howard et al. ............... 705/10 |
| 2007/0112777 A1 | 5/2007 | Field et al. |
| 2007/0129953 A1 | 6/2007 | Cunningham et al. |
| 2007/0136281 A1 | 6/2007 | Li et al. |
| 2007/0190499 A1 | 8/2007 | Baur |
| 2007/0204020 A1* | 8/2007 | Anderson et al. ............ 709/223 |
| 2007/0208685 A1 | 9/2007 | Blumenau |
| 2007/0244912 A1 | 10/2007 | Kawaguchi |
| 2007/0245298 A1* | 10/2007 | Grabarnik et al. ............ 717/104 |
| 2007/0250331 A1* | 10/2007 | Liu et al. ........................ 705/1 |
| 2007/0282746 A1 | 12/2007 | Anke et al. |
| 2008/0065455 A1 | 3/2008 | Sun et al. |
| 2008/0086485 A1 | 4/2008 | Paper |
| 2008/0140778 A1 | 6/2008 | Banavar et al. |
| 2008/0168529 A1 | 7/2008 | Anderson et al. |
| 2008/0243484 A1 | 10/2008 | Mohri et al. |
| 2009/0070165 A1* | 3/2009 | Baeuerle et al. ................ 705/7 |
| 2009/0100407 A1 | 4/2009 | Bouillet et al. |
| 2009/0125366 A1* | 5/2009 | Chakraborty et al. ........... 705/9 |
| 2009/0177957 A1 | 7/2009 | Bouillet et al. |
| 2009/0192783 A1 | 7/2009 | Jurach, Jr. et al. |
| 2009/0249370 A1 | 10/2009 | Liu et al. |
| 2010/0293043 A1 | 11/2010 | Atreya et al. |
| 2011/0078285 A1 | 3/2011 | Hawkins et al. |

OTHER PUBLICATIONS

Riabov, A.; Liu, Z., "Planning for Stream Processing Systems", Proceedings of the American Association for Artificial Intelligence (2005) [retrieved from https://www.aaai.org/Papers/AAAI/2005/AAAI05-191.pdf].*

Baird, R.; Hepner, M.; Jorgenson, N.; Gamble, R., "Automating Preference and Change in Workflows," Seventh International Conference on Composition-Based Software Systems (Feb. 25-29, 2008), pp. 184-193 [retrieved http://ieeexplore.ieee.org/stamp/stamp.jsp?tp=&arnumber=4464023&isnumber=4463987].*

Pistore, M.; Barbon, F.; Bertoli, P.; Shaparau, D.; Traverso, P., "Planning and Monitoring Web Service Composition" (2004), AIMSA 2004, LNAI 3192, pp. 106-115 [retrieved from http://www.springerlink.com/content/21nucbh4rrjfk8av/fulltext.pdf].*

Peer, J., "Web Service Composition As AI Planning—A Survey", (2005) [retrieved from http://decsai.ugr.es/~faro/CDoctorado/bibliografia/refPlanning4SW/LinkedDocuments/webservice-composition-as-aiplanning-pfwsc.pdf].*

Hepner, M., "Dynamic Changes to Workflow Instances of Web Services," (2007), University of Tulsa, [retrieved from http://www.seat.utulsa.edu/papers/Hepner07-Dissertation.pdf].*

Rostoker, C.; Wagner, A.; Hoos, H.;, "A Parallel Workflow for Real-time Correlation and Clustering of High-Frequency Stock Market Data," (Mar. 26-30, 2007), Parallel and Distributed Processing Symposium, 2007. IPDPS 2007. IEEE International pp. 1-10 [retrieved from http://ieeexplore.ieee.org/stamp/stamp.jsp?tp=&arnumber=4227944&isnumber=4227918].*

Zhen Liu, Anand Ranganathan and Anton Riabov, "A Planning Approach for Message-Oriented Semantic Web Service Composition", in AAAI-2007.

Navendu Jain, Lisa Amini, Henrique Andrade, Richard King, Yoonho Park, Philippe Selo and Chitra Venkatramani, "Design, Implementation, and Evaluation of the Linear Road Benchmark on the Stream Processing Core", Proceedings of ACM SIGMOD 2006.

A. Stentz, The Focused D Algorithm for Real-Time Replanning (IJCAI-1995).

D.. Hinchcliffe, "A bumper crop of new mashup platforms", http://blogs.zdnet.com/Hinchcliffe/?p=111&tag=nl.e622.

Narayanan, S., and McIlraith, S. 2002, Simulation, verification and automated composition of web services, in WWW'02.

Traverso, P., and Pistore, M. 2004, Automated composition of semantic web services into executable processes, in ISWC'04.

Marti Hearst, Design Recommendations for Hierarchical Faceted Search Interfaces, ACM SIGIR Workshop on Faceted Search, Aug. 2006.

Lyritsis et al, "TAGs; Scalable threshold based algorithms for proximity computation in graphs", ACM EDBT, pp. 295-306, 2011.

(56) References Cited

OTHER PUBLICATIONS

Riabov et al., Wishful Search: Interactive Composition of Data Mashups, Google 2008, pp. 775-784.
Habernal et al., Active Tags for Semantic Analysis, Google 2008, pp. 69-76.
Jiang et al, "XML RL update language: syntax and semantics", IEEE, pp. 810-816, 2010.
E. Sirin and B. Parsia. Planning for Semantic Web Services. In Semantic Web Services Workshop at 3rd ISWC, 2004.
K. Whitehouse, F. Zhao and J. Liu. Semantic Streams: a Framework for Composable Semantic Interpretation of Sensor Data. In EWSN'06, 2006.
M. Pistore, P. Traverso, P. Bertoli and A. Marconi. Automated Synthesis of Composite BPEL4WS Web Services. In ICWS, 2005.
Comito et al, "Selectively based XML query processing in structured peer to peer networks", ACM IDEAS, pp. 236-244, 2010.
Ma et al, "Mining web graphs for recommendations", IEEE, pp. 1-14, 2011.
Connor et al, "Key key value stores for efficiently processing graph data in t he cloud", IEEE, pp. 88-93, 2011.
Akkiraju et al., "SEMAPLAN: Combining Planning with Semantic Matching to Achieve Web Service Composition", American Association for Artificial Intelligence 2005, pp. 1-8.
Sheshagiri et al., "A Planner for Composing Services Described in DAML-S", ACM 2003, pp. 1-5.
Heinlein, C. "Workflow and Process Synchronization with Interaction Expressions and Graphs", 2001, IEEE, p. 243-252.
Bohannon et al, "Optimizing view queries to ROLEX to support navigable results trees", ACM, pp. 1-12, 2002.
Xie et al., "An additive reliability model for the analysis of modular software failure data", Oct. 24, 1995, IEEE, p. 188-193.
Groen et al., "Reliability data collection and analysis system", Aug. 24, 2004, IEEE, p. 43-48.
Rana et al., An XML Based Component Model for Generating Scientific Applications and Performing Large Scale Simulations in a Meta-computing Environment, Google 2000, pp. 210-224.
Santos-Neto et al., Tracking Usage in Collaborative Tagging Communities, Google 2007, pp. 1-8.
Li et al. Collaborative Tagging Applications and Approaches, IEEE Sep. 2008, pp. 1-8 (14-21).
Altinel, et al. "Damia—A Data Mashup Fabric for Intranet Applications", VLDB '07, Sep. 23-28, 2007, pp. 1370-1373.

* cited by examiner

METHOD AND SYSTEM FOR DYNAMIC SOFTWARE RECONFIGURATION TRIGGERED BY COMPONENT- OR SYSTEM-INITIATED EVENTS

RELATED APPLICATIONS

This application is related to commonly assigned U.S. application Ser. No. 11/872,385, filed Oct. 15, 2007, commonly assigned U.S. application Ser. No. 11/970,262, filed Jan. 7, 2008, commonly assigned U.S. application Ser. No. 11/971,056, filed Jan. 8, 2008, commonly assigned U.S. application Ser. No. 11/971,068, filed Jan. 8, 2008, and commonly assigned U.S. application Ser. No. 12/055,606, filed Mar. 26, 2008, the disclosures of which are all incorporated by reference herein in their entirety.

BACKGROUND OF THE INVENTION

1. Technical Field

The present invention relates to event handling in compositional applications.

2. Discussion of the Related Art

Automatic Application Composition Using Planning

Automated planning methods can be used to create composite applications in compositional architectures, such as web services, and stream processing. The applications are processing graphs composed of smaller modular components, such as service invocations, or other (smaller) processing graphs.

In many scenarios, the components are service invocations (such as web service invocations or invocation of a method of a Java class), and can be described in terms of their data effects and preconditions. In particular, we assume that a description (such as Web Services Description Language (WSDL) or Java object code with optional metadata annotations) of each service specifies the input requirements of the service (such as data type, semantics, access control labels, etc.). We refer to these input requirements as preconditions of service invocation, or simply preconditions. The description also specifies the effects of the service, describing the outputs of the service, including information such as data type, semantics, etc. In general, a service description may describe outputs as a function of inputs, so that the description of the output can only be fully determined once the specific inputs of the service have been determined. Note that in practical implementations the invocations can be synchronous, such as subroutine or Remote Procedure Call (RPC) calls, or asynchronous, such as asynchronous procedure calls or message exchange or message flow.

Under these assumptions, an automated planner can then be used to automatically assemble processing graphs based on a user-provided description of the desired output of the application. The descriptions of the components are provided to the planner in the form of a domain description. The planner can also take into account the specification of available primal inputs to the processing graphs, if not all inputs are available for a particular planning request.

The planner composes processing graphs by connecting components, starting from the primal inputs. It evaluates possible combinations of components, by computing descriptions of component outputs, and comparing them to preconditions of components connected to the output. More than one component input can be connected to one component output or one primal input. Logically, this amounts to sending multiple copies of data produced by the component output, with one copy sent to each of the inputs. In practical implementation, these do not have to be copies, and it is possible to pass data by reference instead of by value. The process terminates when an output of a component (or a set of outputs taken together) satisfy the conditions specified in the user requirement. Note that all conditions are evaluated at plan time, before any applications are deployed or executed.

If multiple alternative compositional architectures can be constructed and shown to satisfy the same request, the planner may use heuristics and utility functions to rank the alternatives and select one or several preferred compositions.

The application, i.e., the processing graph, once composed, is deployed in an execution environment and can be executed.

Examples of a planner and an execution environment are described in Zhen Liu, Anand Ranganathan and Anton Riabov, "A Planning Approach for Message-Oriented Semantic Web Service Composition", in AAAI-2007.

Similar work has been done in contexts of stream processing, for example, in Stream Processing Core described in Navendu Jain, Lisa Amini, Henrique Andrade, Richard King, Yoonho Park, Philippe Selo and Chitra Venkatramani, "Design, Implementation, and Evaluation of the Linear Road Benchmark on the Stream Processing Core", Proceedings of ACM SIGMOD 2006, as well as in Web Services and Grid Computing.

There are two main execution patterns that can be implemented by execution environments. While in web services, the execution of component services in the processing graph takes place when the composed application, i.e., the processing graph, is invoked, and becomes inactive after processing the service invocation request. In stream processing the processing graph begins a continuous processing of streaming data after it is deployed, and components of the processing graph remain active while the graph is processing data.

Commonly assigned U.S. application Ser. No. 11/970,262, filed Jan. 7, 2008 and commonly assigned U.S. application Ser. No. 11/971,068, filed Jan. 8, 2008 describe a system for automatic software assembly, which makes use of automated planning to assemble and configure software components. In that system, the components are assembled into an application in response to a user request that is represented as a set of tags.

Event Notification

Event processing and event and notification systems, such as JMS (Java Message Service) define a common design pattern used in software engineering. Event systems are generally used when one software component needs to be notified of changes in other components. The system allows the interested component to subscribe to events, and provides notification to subscribed components when events occur. Similarly, in database management systems, such as IBM DB2, triggers can be defined in order to react to changes in the data.

For example, in the execution environment described above, any active component of a deployed processing graph can be a source or a subscriber of an event.

Replanning Based on Events

In prior work, especially in the area of robotics, where planning is used, planning has been combined with event processing to react to events by generating new plans. For example, see A. Stentz, "The Focused D* Algorithm for Real-Time Replanning" (IJCAI-1995).

In view of the above, in compositional applications, for example in the processing graphs described above, often no single component has access to interfaces and/or information required to handle events originating in this or other components correctly. The components themselves are designed to be reusable in multiple applications, but event handling procedures differ between applications. Hence, the execution environment becomes responsible for reacting to events. In general, this requires providing one or several event handling procedures together with the processing graph.

SUMMARY OF THE INVENTION

In an exemplary embodiment of the present invention, a method for handling events in compositional applications represented as processing graphs, comprises: receiving an event notification; modifying a planning domain according to the event notification; generating a new processing graph for a previously deployed processing graph by using the modified planning domain; determining if the new processing graph is different than the previously deployed processing graph; and if the processing graphs are different: reconfiguring the previously deployed processing graph to match the new processing graph; or deploying the new processing graph and replacing the previously deployed processing graph with the newly deployed processing graph.

The event notification is initiated by an execution environment. The event notification is triggered by a component in the previously deployed processing graph.

The planning domain includes a plurality of component descriptions. The event notification includes a request to change the planning domain. The request is a request to remove a component description from the planning domain, a request to add a component description to the planning domain or a request to change a component description already in the planning domain. A request to change a component description already in the planning domain involves changing an input condition or an output description of the component.

The method further comprises: presenting a user with the new processing graph; and providing the user with a choice as to whether they wish to replace the previously deployed processing graph with the new processing graph.

In an exemplary embodiment of the present invention, a system for handling events in compositional applications represented as processing graphs, comprises: a memory device for storing a program; a processor in communication with the memory device, the processor operative with the program to: receive an event notification; modify a planning domain according to the event notification; generate a new processing graph for a previously deployed processing graph by using the modified planning domain; determine if the new processing graph is different than the previously deployed processing graph; and if the processing graphs are different: reconfigure the previously deployed processing graph to match the new processing graph; or deploy the new processing graph and replace the previously deployed processing graph with the newly deployed processing graph.

The event notification is initiated by an execution environment. The event notification is triggered by a component in the previously deployed processing graph.

The planning domain includes a plurality of component descriptions. The event notification includes a request to change the planning domain.

The request is a request to remove a component description from the planning domain, a request to add a component description to the planning domain or a request to change a component description already in the planning domain. A request to change a component description already in the planning domain involves changing an input condition or an output description of the component.

The processor is further operative with the program to: present a user with the new processing graph; and provide the user with a choice as to whether they wish to replace the previously deployed processing graph with the new processing graph.

In an exemplary embodiment of the present invention, a computer readable storage medium storing instructions that, when executed by a computer, cause the computer to perform a method for handling events in compositional applications represented as processing graphs, the method comprising: receiving an event notification; modifying a planning domain according to the event notification; generating a new processing graph for a previously deployed processing graph by using the modified planning domain; determining if the new processing graph is different than the previously deployed processing graph; and if the processing graphs are different: reconfiguring the previously deployed processing graph to match the new processing graph; or deploying the new processing graph and replacing the previously deployed processing graph with the newly deployed processing graph.

The event notification is initiated by an execution environment. The event notification is triggered by a component in the previously deployed processing graph.

The planning domain includes a plurality of component descriptions. The event notification includes a request to change the planning domain.

The request is a request to remove a component description from the planning domain, a request to add a component description to the planning domain or a request to change a component description already in the planning domain. A request to change a component description already in the planning domain involves changing an input condition or an output description of the component.

The method further comprising: presenting a user with the new processing graph; and providing the user with a choice as to whether they wish to replace the previously deployed processing graph with the new processing graph.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

DETAILED DESCRIPTION OF EXEMPLARY EMBODIMENTS

Before discussing exemplary embodiments of the present invention in detail, we will provide a brief summary of the invention.

Our invention provides a simple and easy to maintain approach for event handling in compositional applications that can be represented as processing graphs and automatically composed using composition techniques, such as those described in commonly assigned U.S. application Ser. No. 11/970,262, filed Jan. 7, 2008.

Our system uses replanning to react to events, and re-configures deployed applications based on information obtained through event notifications. Two types of event notification are supported: events initiated by the execution environment and events triggered by the components of the application.

The invention can be applied both in the context of information processing application composition, for example to extend the system described in commonly assigned U.S. application Ser. No. 11/872,385, filed Oct. 15, 2007, and in the context of service composition, for example to extend the system described in commonly assigned U.S. application Ser. No. 11/970,262, filed Jan. 7, 2008.

The system described in commonly assigned U.S. application Ser. No. 11/971,068, filed Jan. 8, 2008 and comprised of a planner and an execution environment is also extended to include a replanning service and a request library.

Now that the brief summary is complete, exemplary embodiments of the present invention will now be described.

Figure 1:
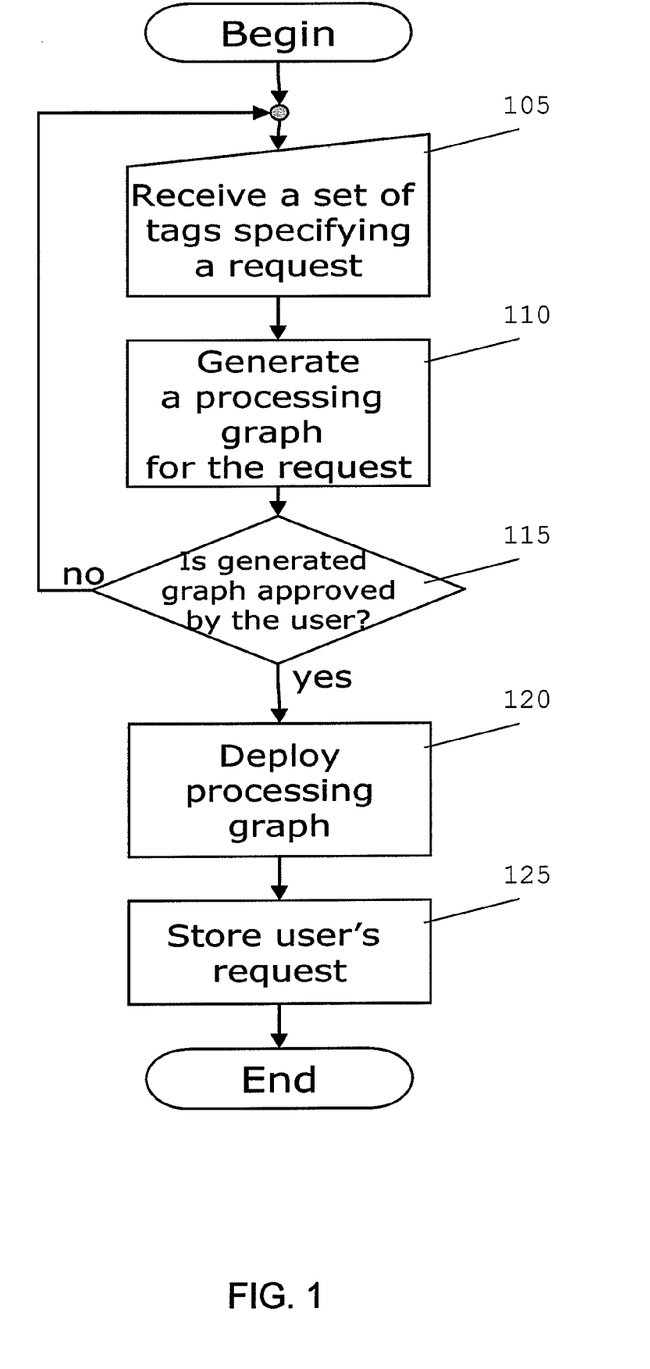
FIG. 1 is a flowchart that illustrates a process of generating and deploying a flow according to an exemplary embodiment of the present invention.

The system operates as follows. One or more processing graphs are composed by the planner and deployed to the execution environment. The requests, for which the processing graphs were composed, are stored in a request library. A flowchart of this process is shown in FIG. 1.

In more detail, a set of tags specifying the request is received (105), the processing graph for the request is generated (110), a determination is made as to whether the generated graph is approved by the user (115), if the graph is approved it is deployed (120) and the request is stored (125), if not, step 105 is repeated.

At run time, events are generated by components or by the execution environment. We assume that software, such as an implementation of JMS (referred to in the Background section), is installed in the execution environment and is configured to handle subscriptions to events and to deliver events to subscribers.

The system is configured such that the replanning service subscribes to events received from the execution environment and from the components. Event information received includes requests for changes to the planning domain. For example, the event may require removing components from the planning domain, or adding certain components back in the planning domain. It may also introduce other changes, for example changing input conditions or output descriptions of certain components. In most scenarios, the change affects the portion of the planning domain describing the component that is the source of the event. However, in certain cases, the change may affect descriptions of other components.

Figure 2:
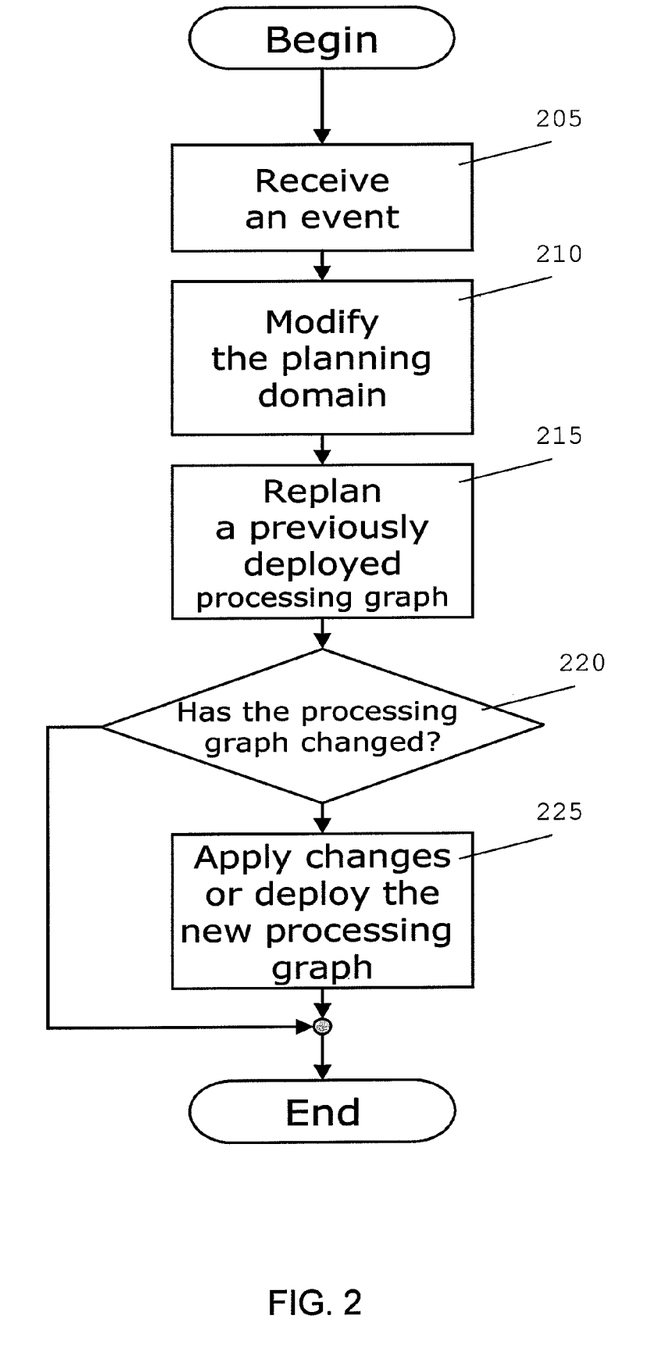
FIG. 2 is a flowchart that illustrates processing an event according to an exemplary embodiment of the present invention.

A flowchart for processing an event (without optional user interaction) is illustrated in FIG. 2.

Upon receiving an event, the replanning service interprets the received information and makes changes to the planning domain accordingly. In some scenarios changes can also be made to the requests stored in the request library.

Theses changes propagate to the execution environment and affect the deployed processing graphs as follows. The processing graph composer is invoked (immediately on receiving an event (205), or, alternatively, periodically at regular intervals) to re-evaluate the planning requests stored in the request library (210/215). If the resulting processing graphs produced by the composer for the requests are different from those previously produced and deployed (220), the deployed applications are configured to match the new compositions, or are re-deployed, replacing the old composition with the new (225).

Optionally, the step of replacing the deployed processing graph can also involve user interaction. In those cases, the system is presenting a user with the alternative new composition for previously submitted requests, and requesting the user to make the decision about replacing the deployed composition with one of the newly produced compositions.

Application Example

Figure 3:
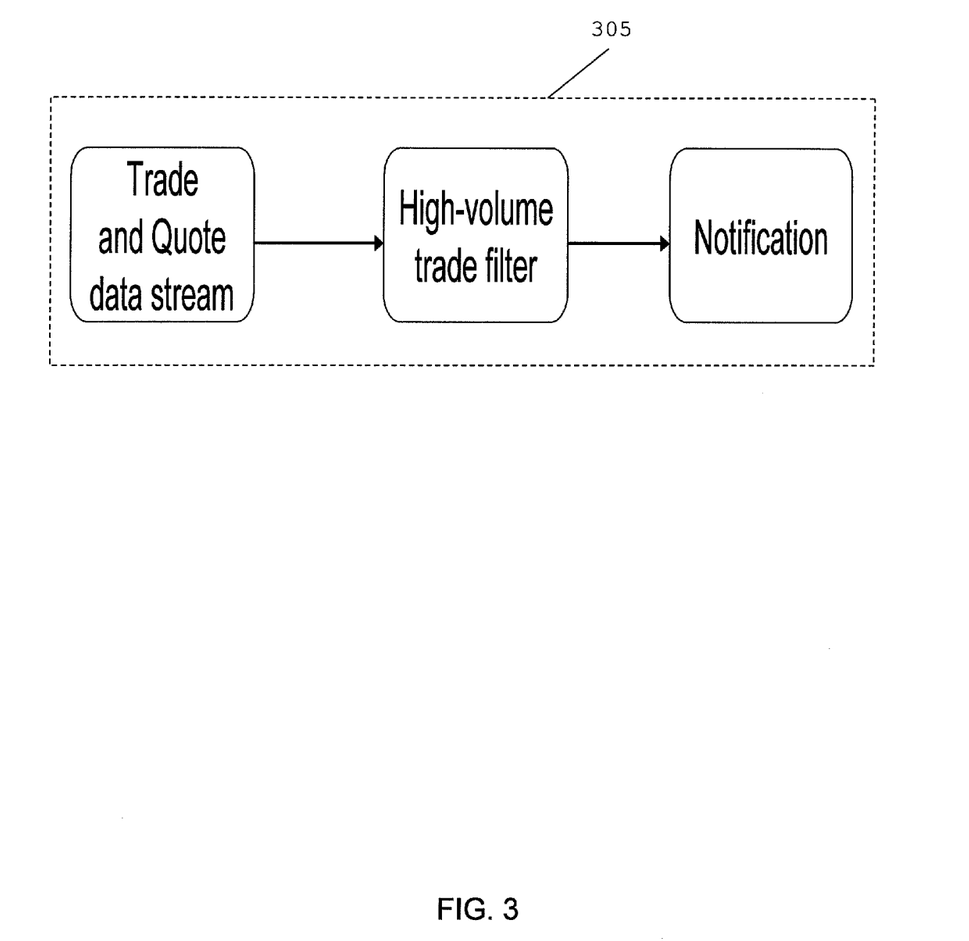
FIG. 3 illustrates an exemplary processing graph.
Figure 4:
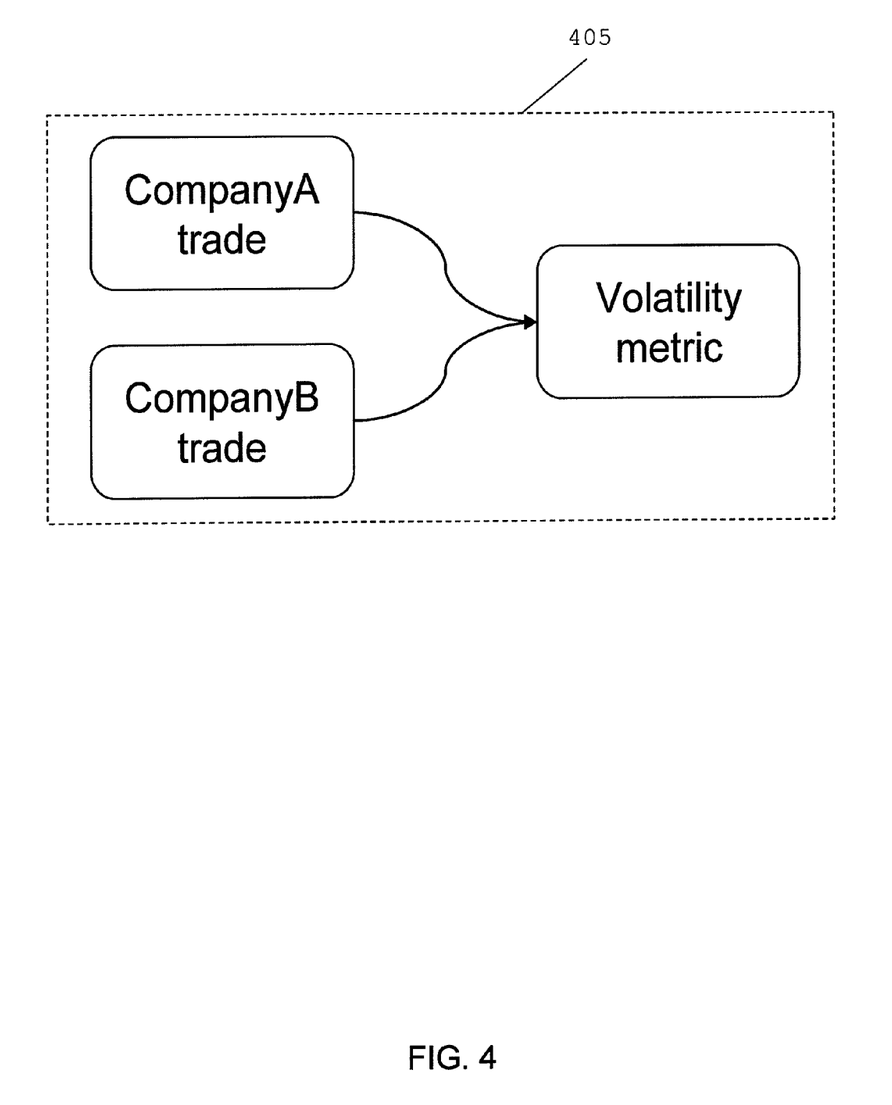
FIG. 4 illustrates another exemplary processing graph.

For example, consider the case where the execution environment is a stream processing system, for example the Stream Processing Core as described in the Jain et al. paper cited in the Background section. Further, assume that there are two processing graphs 305 and 405 deployed in the execution environment.

The first processing graph 305 (see FIG. 3) is processing streaming stock data (e.g., real time information about stocks traded at NYSE) and analyzes for abnormal trade volume. When a stock traded at an unusually high trade volume is detected, the first processing graph 305 notifies the replanning service of a new data source carrying high trade volume data for that stock ticker.

The second processing graph 405 (see FIG. 4) computes a metric of market volatility based on real-time analysis trade patterns of several stocks with the highest trade volume. It has a number of sources, each source corresponding to trades of a particular stock traded at a high volume. When the notification about a new stock traded at high volume is received by the replanning service, the service generates a new processing graph 505 (see FIG. 5) replacing the second processing graph 405, taking into account the new source during planning.

Figure 5:
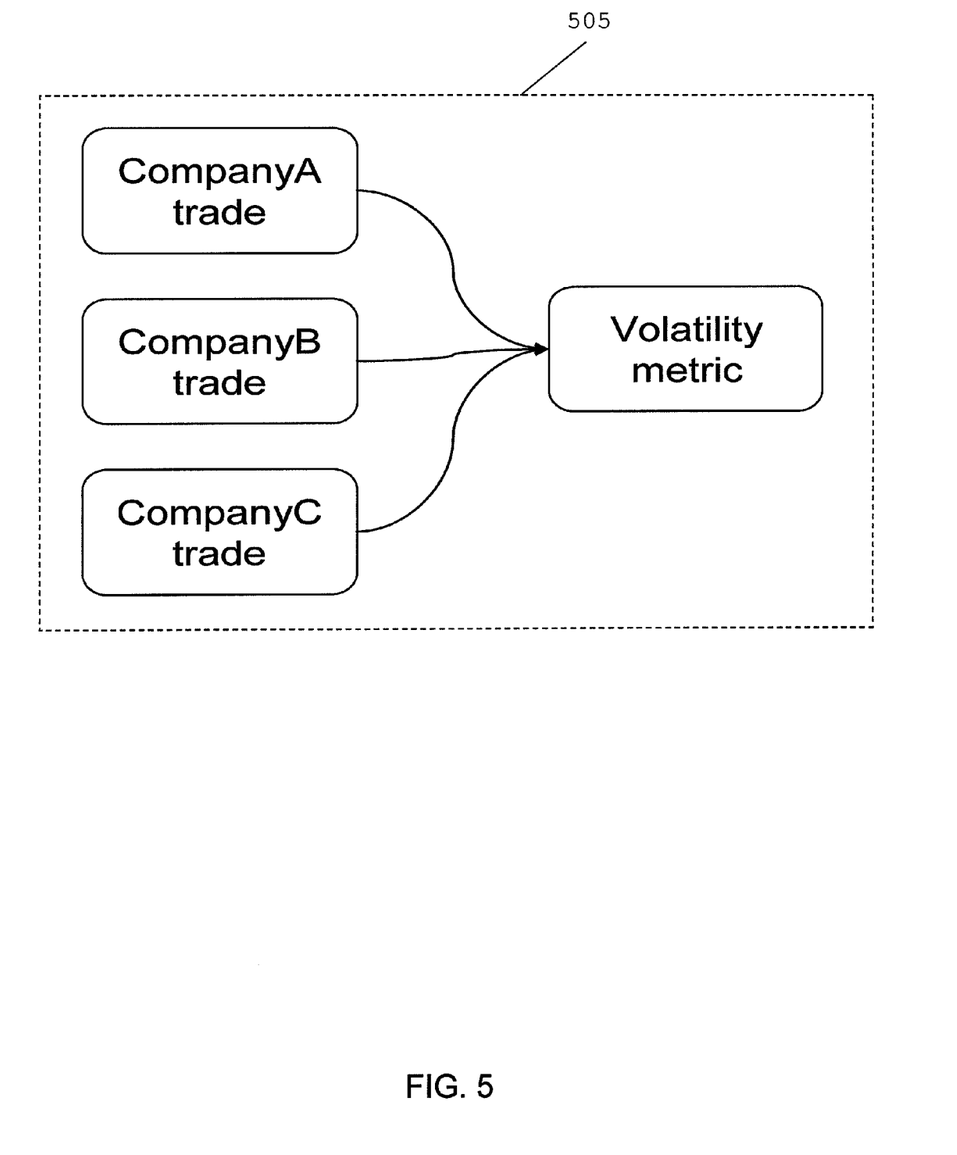
FIG. 5 illustrates the processing graph of FIG. 4 after replanning according to an exemplary embodiment of the present invention.

In this example, the modification of the domain is done by adding a description of a source component. In general, events received by the replanning service can also request deletion of components from the planning domain or request changes to descriptions of the components. The events can also change resource bounds and objectives used during planning. Events can be sent by the same processing graph that is affected by replanning, or, as in our example, by a different processing graph, or by other entities, for example by the execution environment. An event can lead to one graph being replanned, as in the example, but can also result in several graphs being replanned. Events can be sent to the replanning service by a specialized notification component, as in the example, but can also be sent by components that perform other functions and are not specifically developed for the purpose of delivering notifications to the replanning service.

In this example, the following components descriptions may be used (following the component description notation introduced in commonly assigned U.S. application Ser. No. 11/971,068, filed Jan. 8, 2008):

```
service TradeAndQuoteDataStream {
    output{TAQData}
}
service HighVolumeTradeData {
    input {TAQData}
    output {HVTrades}
}
service Notification {
    input {HVTrades}
    output {HVTradesNotification}
}
```

```
service CompanyATrade {
    output{FilteredHVTrades CompanyA}
}
service CompanyBTrade {
    output{FilteredHVTrades CompanyB}
}
service VolatilityMetric2 {
    input {FilteredHVTrades}
    input {FilteredHVTrades}
    output {VolatilityMetric}
}
service VolatilityMetric3 {
    input {FilteredHVTrades}
    input {FilteredHVTrades}
    input {FilteredHVTrades}
    output {VolatilityMetric}
}
```

Planning goal for the first processing graph:

```
{HVTradesNotification}
```

Planning goal for the second processing graph:

```
{VolatilityMetric}
```

The description added to the planning domain after receiving the event from the first processing graph regarding company C, assuming the event contains this description along with instructions to add it to the planning domain, and no additional knowledge is required to process the event:

```
service CompanyCTrade {
    output{FilteredHVTrades CompanyC}
}
```

Example System Architecture

Figure 6:
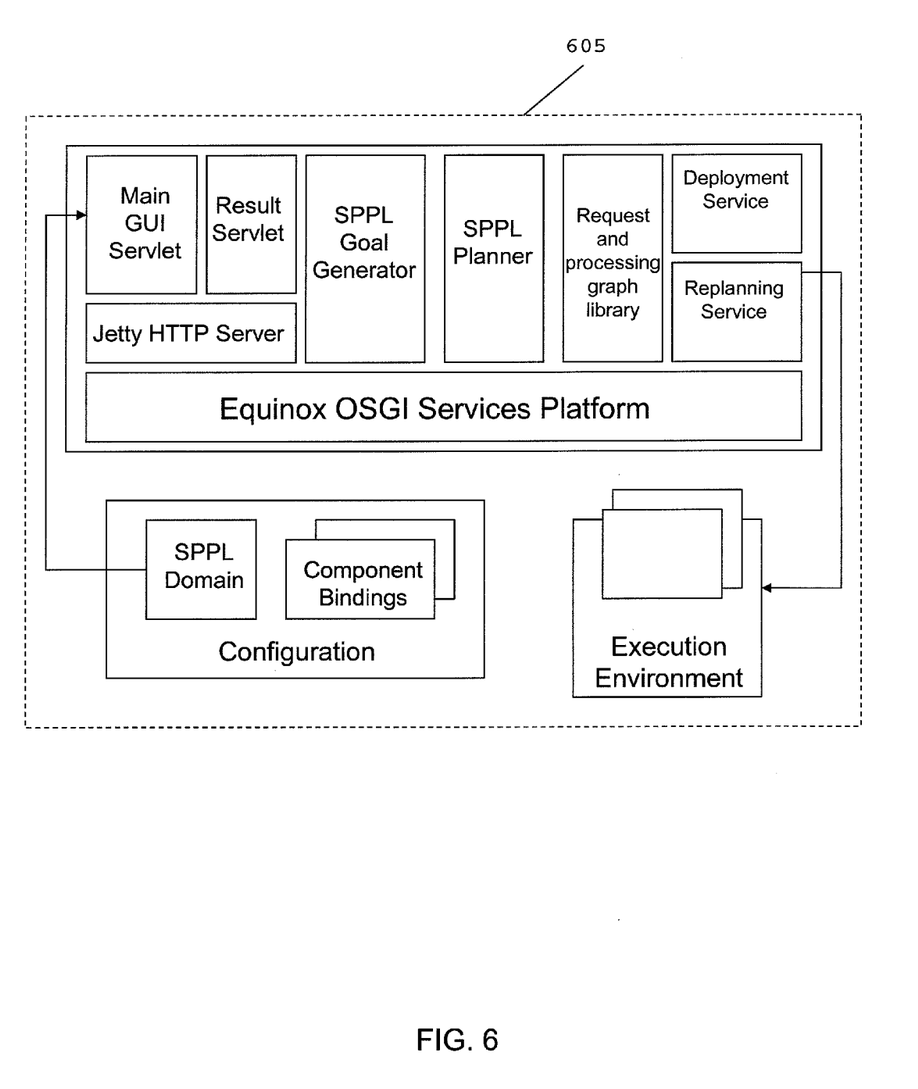
FIG. 6 illustrates the architecture of a system according to an exemplary embodiment of the present invention.

FIG. 6 shows an example architecture of the system 605. The system 605 consists of several modules implemented as OSGi services deployed on an Eclipse Equinox implementation of an OSGi platform. The Graphical User Interface (GUI) is implemented by two servlets, the Main GUI Servlet that generates a user interaction screen and the Results Servlet that generates a "preview of results" screen.

Jetty web server, integrated with OSGi platform is used to host the servlets. Stream Processing Planning Language (SPPL) Goal Generator service generates SPPL goal descriptions based on a user-specified set of tags submitted via the Main GUI Servlet.

SPPL Planner service invokes an SPPL planner to process the generated goal and generate a processing graph. Examples of a planner and an execution environment are described in Zhen Liu, Anand Ranganathan and Anton Riabov, "A Planning Approach for Message-Oriented Semantic Web Service Composition", in AAAI-2007, a copy of which is incorporated by reference herein in its entirety.

Request and processing graph library stores the requests received from the user, and the processing graphs that were composed and deployed for these requests. Stored requests are used by the replanning service to initiate replanning when events are received. Replanning service subscribes to events generated by the Execution Environment and the processing graphs deployed therein, via an event notification mechanism such as JMS. Stored requests are used during replanning as planning goals that are processed by the planner in the planning domain modified when events are received.

The Deployment Service translates the processing graph produced by the SPPL planner to the format recognized by the target execution environment. The Deployment Service can also include procedures for deploying the translated processing graph in the target execution environment, for invoking the deployed processing graph and retrieving results of its execution, and for generating a preview of results received from the processing graph.

The system is configured by providing an SPPL domain description that includes descriptions of all service components and primal data, and optionally a set of component bindings. The component bindings are files used by the deployment service to generate a platform-specific representation of the processing graph. The component bindings are typically represented as templates, with one template provided for each component, with placeholders that are filled in by the platform adapter to represent connections between components in generated processing graphs.

A brief hardware description of a computer in which the system or parts of the system described above may be implemented will now be described.

Figure 7:
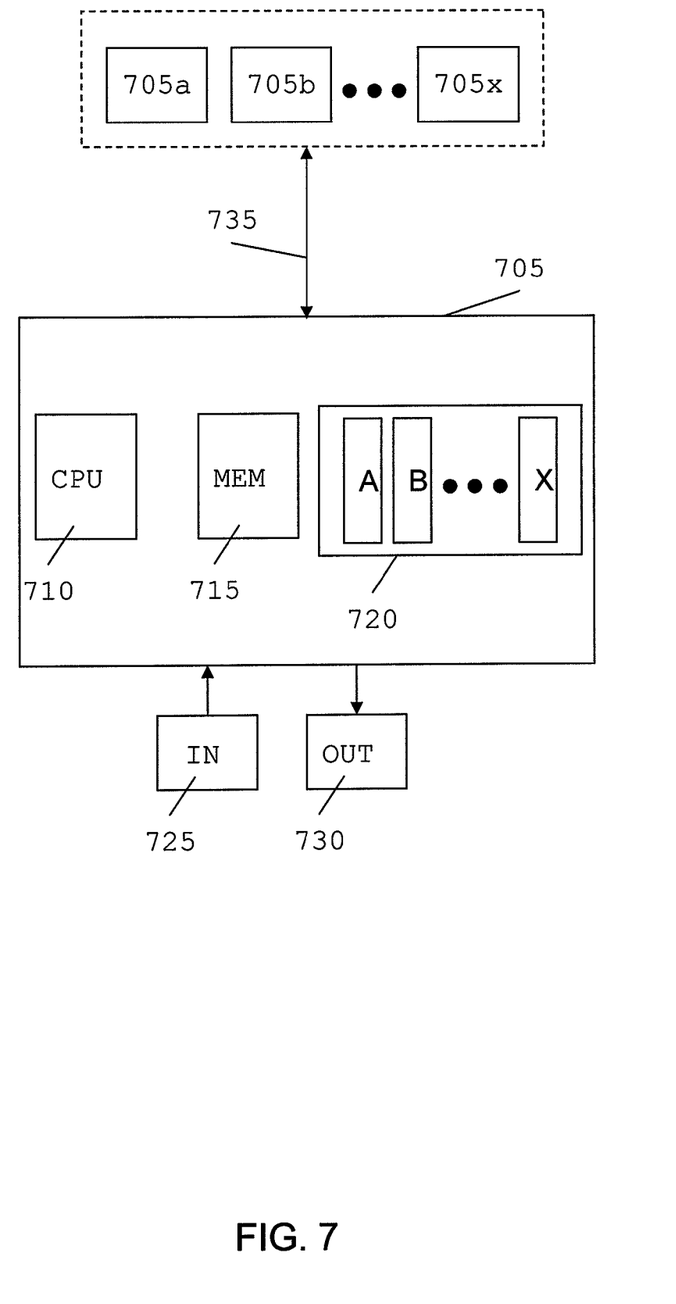
FIG. 7 is a block diagram that illustrates a computer in which an exemplary embodiment of the present invention may be implemented.

As shown in FIG. 7, a computer 705, which may be a laptop computer or server, includes a central processing unit (CPU) 710, a memory 715 and a module set 720 that includes program code for executing methods in accordance with exemplary embodiments of the present invention. The computer 705 is also coupled to input and output devices 725 and 730 and other computers 705a, b . . . x via a network 735.

The memory 715 includes random access memory (RAM) and read only memory (ROM). The memory 715 can also include a database, disk drive, tape drive or a combination thereof. The input 725 is constituted by a keyboard or mouse and the output 730 is constituted by a display or printer. The network 735 may be the Internet, for example.

It is understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

It is also understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It is further understood that the above description is only representative of illustrative embodiments. For convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be implemented without departing from the spirit and scope of the present invention.

It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A method for handling events in compositional applications represented as processing graphs, comprising:
   receiving an event notification from an execution environment;
   modifying a planning domain according to the event notification;
   generating, using a processor of a computer, a new processing graph for a previously deployed first processing graph by using machine code executable by the computer to process the modified planning domain;
   determining if the new processing graph is different than the previously deployed first processing graph; and
   if the processing graphs are different:
   deploying the new processing graph and replacing the previously deployed first processing graph with the newly deployed processing graph,
   wherein the event notification is triggered in response to a new data source identified by a previously deployed second processing graph,
   wherein the event notification itself includes a component description and instructions to add the component description to the planning domain.

2. The method of claim 1, wherein the previously deployed first processing graph is deployed in the execution environment.

3. The method of claim 1, wherein the event notification is triggered by a component in the previously deployed second processing graph.

4. The method of claim 1, wherein the planning domain includes a plurality of component descriptions.

5. The method of claim 1, further comprising:
   presenting a user with the new processing graph; and
   providing the user with a choice as to whether they wish to replace the previously deployed first processing graph with the new processing graph.

6. A system for handling events in compositional applications represented as processing graphs, comprising:
   a memory device for storing a program;
   a processor in communication with the memory device, the processor operative with the program to:
   receive an event notification from an execution environment;
   modify a planning domain according to the event notification;
   generate a new processing graph for a previously deployed first processing graph by using the modified planning domain;
   determine if the new processing graph is different than the previously deployed first processing graph; and
   if the processing graphs are different:
   deploy the new processing graph and replace the previously deployed first processing graph with the newly deployed processing graph,
   wherein the event notification is triggered in response to a new data source identified by a previously deployed second processing graph,
   wherein the event notification itself includes a component description and instructions to add the component description to the planning domain.

7. The system of claim 6, wherein the previously deployed first processing graph is deployed in the execution environment.

8. The system of claim 6, wherein the event notification is triggered by a component in the previously deployed second processing graph.

9. The system of claim 6, wherein the planning domain includes a plurality of component descriptions.

10. The system of claim 6, wherein the processor is further operative with the program to:
    present a user with the new processing graph; and
    provide the user with a choice as to whether they wish to replace the previously deployed first processing graph with the new processing graph.

11. A non-transitory computer readable storage medium storing instructions that, when executed by a computer, cause the computer to perform a method for handling events in compositional applications represented as processing graphs, the method comprising:
    receiving an event notification from an execution environment;
    modifying a planning domain according to the event notification;
    generating a new processing graph for a previously deployed first processing graph by using the modified planning domain;
    determining if the new processing graph is different than the previously deployed first processing graph; and
    if the processing graphs are different:
    deploying the new processing graph and replacing the previously deployed first processing graph with the newly deployed processing graph,
    wherein the event notification is triggered in response to a new data source identified by a previously deployed second processing graph,
    wherein the event notification itself includes a component description and instructions to add the component description to the planning domain.

12. The computer readable medium of claim 11, wherein the previously deployed first processing graph is deployed in the execution environment.

13. The computer readable medium of claim 11, wherein the event notification is triggered by a component in the previously deployed second processing graph.

14. The computer readable medium of claim 11, wherein the planning domain includes a plurality of component descriptions.

15. The computer readable medium of claim 11, the method further comprising:
    presenting a user with the new processing graph; and
    providing the user with a choice as to whether they wish to replace the previously deployed first processing graph with the new processing graph.

* * * * *